O. W. HANSON.
PISTON RING.
APPLICATION FILED DEC. 2, 1919.
1,384,131.
Patented July 12, 1921.
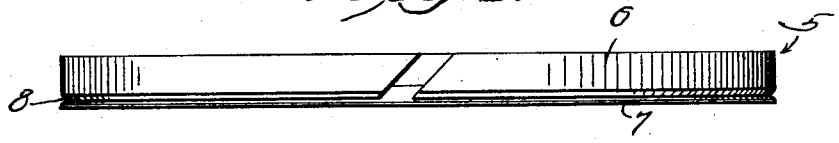
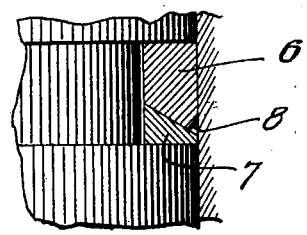
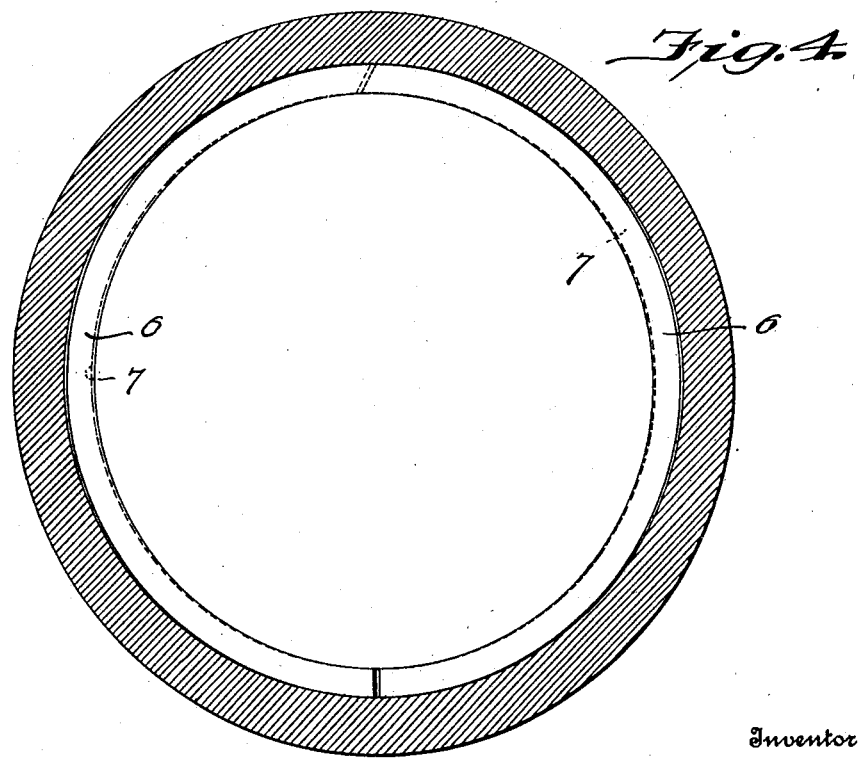
Inventor
Oscar W. Hanson

UNITED STATES PATENT OFFICE.

OSCAR W. HANSON, OF SALINA, KANSAS, ASSIGNOR OF ONE-HALF TO JOSEPH J. SULLIVAN, OF SALINA, KANSAS.

PISTON-RING.

1,384,131.  Specification of Letters Patent.  Patented July 12, 1921.

Application filed December 2, 1919. Serial No. 342,002.

*To all whom it may concern:*

Be it known that I, OSCAR W. HANSON, a citizen of the United States, residing at Salina, in the county of Saline and State of Kansas, have invented new and useful Improvements in Piston-Rings, of which the following is a specification.

This invention relates to piston rings, and particularly to rings for use in connection with the pistons of internal combustion engines, the primary object of the invention being to provide piston rings of such construction as to automatically adapt themselves to irregularities in the interior face of the cylinder, thus obviating leakages past the piston.

A further object of the invention is to provide a piston ring so constructed as to firmly wedge itself into the groove in the piston, this wedging action causing the ring to bind itself within the groove to such degree as to prevent the ring rotating.

A further object of the invention is to provide a piston ring adapting itself automatically to the interior of the cylinder surface with sufficient tightness not only to prevent leakage past the piston, but to prevent oil passing the ring or entering the groove in which the ring is seated.

With these objects in view, together with others which will appear as the description proceeds, the invention resides in the novel construction, combination and arrangement of parts, all as will be described more fully hereinafter, illustrated in the drawing, and particularly pointed out in the claims.

In the drawing,

Figure 1 is an edge view of a piston ring constructed in accordance with the invention, Fig. 2 is a similar view of one of the separable sections of the ring.

Fig. 3 is an enlarged fragmentary sectional view illustrating the manner in which the ring sections are assembled upon the piston and the manner in which they meet the cylinder surface to conform to the shape thereof, and Fig. 4 is a transverse sectional view taken through a conventional form of cylinder and illustrating diagrammatically the manner in which the piston ring fits therein.

Referring now more particularly to the drawing, 5 represents the piston ring in its entirety, the same consisting of sections 6 and 7. These sections are constructed of suitable metal and are of the proper diameter to fit within the ring channel in the piston and to conform at their outer peripheries to the interior surface of the cylinder. The section 6 of the ring, it will be observed, is of greater breadth than the companion section 7, and the outer end edge of the ring section 6 is smooth and flat and shaped so as to lie snugly against one wall of the ring groove in the piston. The opposite or inner end edge of this ring section 6 is beveled or inclined inwardly from its outer to its inner peripheries, this inclined surface being flat and smooth throughout the extent of the section. The ring section 7 is materially narrower than the section 6 and has its outer end edge flat and straight throughout the extent of the ring and adapted to lie flush against the opposite wall of the ring receiving groove of the piston. The opposite or inner edge of this section 7 is cut away or beveled corresponding to the adjacent beveled edge of ring section 6, and when the rings are properly assembled these beveled faces are engaged with each other. The ring sections are of equal thickness, and the inclination of one edge of ring section 7 causes the outer periphery of the said section to be extremely thin or approximately but not, however, extending to a knife edge. The outer periphery of ring section 6 is cut away angularly upon the side having the inclined face, whereby an oil groove 8 is formed between the section 6 and the section 7, the said groove being in the outer periphery of the assembled ring.

The ring sections are split on an angle as shown in Figs. 1 and 2, and are spread so as to compel the same to be contracted slightly before being applied to the groove in the piston. By reason of the tendency of these sections to spring outwardly, the inclined surfaces of said sections will cause said sections to spread and fill the groove and peripheries of the ring sections will be caused to engage the inner walls of the cylinder. In applying the sections to the piston, the ring sections are turned so that their split portions will be diametrically opposed and at right angles to the plane of the piston slap in the cylinder. By so assembling the ring and by so disposing the ring sections, the greatest degree of expansion of the sections will be disposed at those portions of the cylinder surface that are subjected to the greatest amount of wear, so that the ring sections will be enabled to expand so as to compensate for deformities occurring in the interior walls of the cylinder.

As stated, the narrow edge at the outer periphery of the ring section 7 is capable of quickly wearing away so as to conform to irregularities in the cylinder. Initially the ring sections 6 and 7 are fitted loosely in the piston groove and hence the tendency of the narrow or thin ring section 7 is to spring outwardly and to wedge itself and the ring section 6 in the piston groove, thus tightly packing said groove against leakage of gases and oil, and at the same time both ring sections move outward to seat themselves against the walls of the cylinder. As the cylinder wears and the outer peripheral faces of the ring sections also wear, thus tending to cause a loose fit of the ring as a whole in the piston groove, the ring section 7 moves farther outward and again wedges and packs the ring sections in the piston groove, and at the same time the sharp edge of the narrow ring section 6 engaging the worn surface of the cylinder rapidly wears away and shapes itself to the form of the cylinder, thus securing a very quick seating action of the ring on the worn cylinder wall to maintain a tight fit and prevent the seepage of lubricating oil to the ring groove or the passage of compressed gases or air past the piston ring. This result is obtained by making the degree of inclination of the abutting faces of the ring sections comparatively gentle, the diagonal line of division between said sections forming an angle of less than 30° (at the most not more than 30°) with the end faces of the ring sections. This angle of division is, therefore, not great enough to tend to cause the ring sections to jam or bind in the piston groove, and at the same time reduces the transverse area of the section 7 to that of a thin wedge which is sensitively adjustable for the efficient quick wearing and seating action defined. In this respect my invention differs essentially in function from a ring construction embodying similar reversed diagonally divided ring sections, divided on an angle of 45° or at an angle greater than 30° with relation to the end faces of the ring sections, in which the function of the ring section having its narrow edge outwardly directed is to maintain wedging contact with the other ring section for a groove packing action simply and to force the broad face of the latter-named ring section into contact with the cylinder wall to sustain the ring and in which no outward adjustment of and contact of the sharp edge of the first-named ring section for rapid wear and quick seating action is contemplated and provided for. In my construction also the section 6, instead of being a reversed counterpart of section 7, is of materially greater breadth than the section 7, so that as the rings wear away the ring section 7, being in the form of a comparatively thin wedge, instead of jamming with the ring section 6 in the piston groove, will move outwardly and constantly press its thin edge into engagement with the cylinder wall, so that the rapidity of wear of the outer surface of section 7 will always be materially greater than that of the outer surface of section 6, whereby at all times in the service of the ring the quick wearing and seating function of the section 6 will be maintained. It will be further observed that in my construction the cutting away of the outer portion of the inclined face of section 6 at an angle to the inclined face of section 7 to form the oil groove 8 between such section provides for the flow of the oil directly against the sharp edge of section 7 to prevent such edge from exerting any undue cutting action on the cylinder wall, while it also retains a supply of oil at a point to seal the joint between the rings from any possibility of leakage. The pocket or groove 8 in the periphery of the ring also permits of sufficient quantities of lubricating oil to be carried by the ring to properly lubricate the cylinder and to keep the coacting beveled faces of the sections oiled so as to insure proper operation of the ring sections. It will be evident that the constant wedging of the ring sections, due to the expansive properties of the rings, binds the sections within the ring groove with sufficient force to prevent rotative movement of the ring in the groove or rotary movement of the sections relative to each other.

It will be observed that in Fig. 4 of the drawing the ring discloses one of the sections expanded to a greater degree than the other. It is well known that the greatest amount of wear in the cylinder of an internal combustion engine occurs upon those sides of the cylinder as lie in the plane of the piston slap or thrust. To compensate for leakages which occur at such points, the ring sections are assembled so that the greatest amount of expansion of the same will occur at the points of greatest wear. By reason of the narrow edge of ring section 7, this ring will wear away more or less rapidly, thereby adapting it for a quick seating action in shaping itself to conform to the irregularities in the cylinder surface caused by this wear. As the cylinder further wears, the ring 7 will adjust itself, and in this adjustment binding action of the sections 7—6 will cause the ring to at all times firmly seat in the piston groove and at the same time conform to the shape of the cylinder.

By so constructing and assembling the ring, leakages are practically eliminated, which materially increases the efficiency of the motor, both as regards power expended in combustion as well as the charge drawn into the cylinder on the suction stroke of the piston.

Having thus fully described my invention, I claim:—

1. A composite piston packing comprising a pair of coaxially disposed resilient ring sections of equal minor and major diameter and initially of a combined cross-section to loosely engage the piston groove in which they are to fit, one of said ring sections being of materially greater cross-sectional area than the other, the abutting faces of said ring sections extending on a diagonal line between their inner and outer peripheries, said diagonal line forming an angle of less than 30° with the end faces of the ring members, the outer periphery of the narrower ring section being reduced to a comparatively thin edge arranged for wearing contact with the cylinder wall, whereby, in the wearing of said ring sections and the cylinder wall and the resulting loosening of the packing in the piston groove, the ring sections will spring outwardly and the thin edge of the narrower ring section will engage and be rapidly worn away by the cylinder wall for a rapid seating action and adjustment of said narrower ring section to force the broader ring section outwardly and bind both ring sections against the walls of the piston groove.

2. A composite piston packing comprising a pair of coaxially disposed resilient ring sections of equal minor and major diameter and initially of a combined cross-section to loosely engage the piston groove in which they are to fit, one of said ring sections being of materially greater cross-sectional area than the other, the abutting faces of said ring sections extending on a diagonal line between their inner and outer peripheries, said diagonal line forming an angle of less than 30° with the end faces of the ring members, the outer periphery of the narrower ring section being reduced to a comparatively thin edge arranged for wearing contact with the cylinder wall, and the outer edge of the abutting face of the broader ring section being cut away at a reverse diagonal angle to the opposed abutting face of the narrower ring section whereby to provide a continuous annular oil groove adjacent to said thin wear edge of the narrower ring section and around the joint between said ring sections.

In testimony whereof I affix my signature.

OSCAR W. HANSON.